United States Patent
Brito Da Silva et al.

(10) Patent No.: US 12,242,970 B2
(45) Date of Patent: Mar. 4, 2025

(54) INCREMENTAL CLUSTER VALIDITY INDEX-BASED OFFLINE CLUSTERING FOR MACHINE LEARNING

(71) Applicant: Guise AI, Inc., Rolla, MO (US)

(72) Inventors: Leonardo Enzo Brito Da Silva, Natal (BR); Donald C. Wunsch, II, Rollo, MO (US); Nagasharath Rayapati, San Ramon, CA (US)

(73) Assignee: Guise AI, Inc., Rolla, MO (US)

( * ) Notice: Subject to any disclaimer, the term of this patent is extended or adjusted under 35 U.S.C. 154(b) by 654 days.

(21) Appl. No.: 17/402,938

(22) Filed: Aug. 16, 2021

(65) Prior Publication Data
US 2022/0318632 A1 Oct. 6, 2022

Related U.S. Application Data

(60) Provisional application No. 63/066,209, filed on Aug. 15, 2020.

(51) Int. Cl.
*G06N 3/082* (2023.01)
*G06N 3/04* (2023.01)
*G06N 3/043* (2023.01)

(52) U.S. Cl.
CPC ........ *G06N 3/082* (2013.01); *G06N 3/0409* (2013.01); *G06N 3/043* (2023.01)

(58) Field of Classification Search
CPC ...... G06N 3/082; G06N 3/0409; G06N 3/043; G06N 3/088
See application file for complete search history.

(56) References Cited

U.S. PATENT DOCUMENTS 9,043,326 B2  5/2015 Wunsch, II et al.

OTHER PUBLICATIONS

Brito da Silva, Leonardo Enzo & Melton, Niklas & Wunsch, Donald. (2019). Incremental Cluster Validity Indices for Hard Partitions: Extensions and Comparative Study. 10.48550/arXiv.1902.06711. (Year: 2019).*

(Continued)

*Primary Examiner* — Abdullah Al Kawsar
*Assistant Examiner* — Gisel Gabriela Faccenda
(74) *Attorney, Agent, or Firm* — Jeffrey Pearce

(57) ABSTRACT

A neural network model replaces the supervised labeling component of a supervised learning system with an incremental cluster validity index-based unsupervised labeling component. An implementation is presented combining fuzzy adaptive resonance theory predictive mapping (ARTMAP) and incremental cluster validity indices (iCVI) for unsupervised machine learning purposes, namely the iCVI-ARTMAP. An iCVI module replaces the adaptive resonance theory (ART) module B of a fuzzy ARTMAP neural network model and provides assignments of input samples to clusters (i.e., labels) at each learning iteration in accordance to any of several possible iCVI methods described. A map field incrementally builds a many-to-one mapping of the categories of ART module A to the cluster labels. At the end of each learning epoch, clusters may be merged and/or split using the iCVI, which is recomputed incrementally except for the newly cluster during a split. The iCVI-ARTMAP performs offline incremental multi-prototype-based clustering driven by the iCVI.

18 Claims, 2 Drawing Sheets

(56) References Cited

OTHER PUBLICATIONS

Lim, C.P., Kuan, M.M. & Harrison, R.F. Application of fuzzy ARTMAP and fuzzy c-means clustering to pattern classification with incomplete data. Neural Comput & Applic 14, 104-113 (2005). https://doi.org/10.1007/s00521-004-0445-9 (Year: 2005).*

Mu-Chun Su, Jonathan Lee, Kuo-Lung Hsieh, A new ARTMAP-based neural network for incremental learning, Neurocomputing, vol. 69, Issues 16-18,2006,pp. 2284-2300, ISSN 0925-2312, https://doi.org/10.1016/j.neucom.2005.06.020. (Year: 2006).*

Moshtaghi, M., et al., "Online Cluster Validity Indices for Streaming Data. ArXiv e-prints", Jan. 2018, arXiv:1801.02937v1.

Moshtaghi, M, et al., "Online cluster validity indices for performance monitoring of streaming data clustering", International Journal of Intelligent Systems, 34(4):541-563, 2019.

D. L. Davies, et al., "A cluster separation measure", IEEE Transactions on Pattern Analysis and Machine Intelligence, PAMI-1(2):224-227, Apr. 1979.

J. C. Bezdek, et al., "Some new indexes of cluster validity", IEEE Transactions on Systems, Man, and Cybernetics, Part B (Cybernetics), 28(3):301-315, Jun. 1998.

L. E. Brito da Silva., "Neuroengineering of clustering algorithms," Ph.D. dissertation, Missouri University of Science and Technology, Rolla, Mo, USA, 2019.

L. E. Brito da Silva, et al., "Incremental Cluster Validity Indices for Online Learning of Hard Partitions: Extensions and Comparative Study", IEEE Access, 8:22025-22047, 2020.

J. B. MacQueen "Some Methods for Classification and Analysis of MultiVariate Observations", L. M. Le Cam and J. Neyman, editors, Proc. fifth Berkeley Symposium on Mathematical Statistics and Probability, vol. 1, pp. 281-297. University of California Press, 1967.

S. Kim, "Novel approaches to clustering, biclustering algorithms based on adaptive resonance theory and intelligent control", PhD thesis, Missouri University of Science and Technology, 2016.

R. Yelugam, et al., "TopoBARTMAP: Biclustering ARTMAP With or Without Topological Methods in a Blood Cancer Case Study", in Proc. IEEE International Joint Conference on Neural Networks (IJCNN), 2020.

Malay K. Pakhira, et al., "Validity index for crisp and fuzzy clusters", Pattern Recognition, 37(3):487-501, 2004.

Qinpei Zhao, et al., "WB-index: A sum-of-squares based index for cluster validity", Data & Knowledge Engineering, 92:77-89, 2014.

Kuo-Lung Wu, et al., "A cluster validity index for fuzzy clustering", Pattern Recognition Letters, 26(9):1275-1291, 2005.

Luis F. Lago-Fernandez, et al., "Fuzzy Cluster Validation Using the Partition Negentropy Criterion", pp. 235-244, Springer Berlin Heidelberg, Berlin, Heidelberg, 2009.

Kadim Tasdemir, et al., "A Validity Index for Prototype-Based Clustering of Data Sets With Complex Cluster Structures", IEEE Transactions on Systems, Man, and Cybernetics, Part B (Cybernetics), 41(4):1039-1053, Aug. 2011.

Edwin Lughofer, "Extensions of vector quantization for incremental clustering", Pattern Recognition, 41(3):995-1011, 2008.

L. E. Brito da Silva, et al., "Validity Index-based Vigilance Test in Adaptive Resonance Theory Neural Networks", in Proc. IEEE Symposium Series on Computational Intelligence (SSCI), pp. 1-8, Nov. 2017.

Gail A. Carpenter, et al., "Fuzzy ART: Fast stable learning and categorization of analog patterns by an adaptive resonance system", Neural Networks, 4(6):759-771, 1991.

G. A. Carpenter, et al., "A fuzzy ARTMAP nonparametric probability estimator for nonstationary pattern recognition problems", IEEE Transactions on Neural Networks, 6(6):1330-1336, Nov. 1995.

G. A. Carpenter, et al., "Fuzzy ARTMAP: A neural network architecture for incremental supervised learning of analog multidimensional maps", IEEE Transactions on Neural Networks, 3(5):698-713, Sep. 1992.

David Arthur et al., "K-Means++: The Advantages of Careful Seeding", Proceedings of the Eighteenth Annual ACM-SIAM Symposium on Discrete Algorithms, SODA'07, p. 1027-1035, USA, 2007, Society for Industrial and Applied Mathematics.

* cited by examiner

INCREMENTAL CLUSTER VALIDITY INDEX-BASED OFFLINE CLUSTERING FOR MACHINE LEARNING

CROSS REFERENCE TO RELATED APPLICATIONS

This application claims priority of U.S. Provisional Patent Application No. 63/066,209, filed 15 Aug. 2020.

TECHNICAL FIELD

This invention relates to unsupervised machine learning.

BACKGROUND

Batch cluster validity indices (bCVIs) are ubiquitously used in cluster analysis to quantify the quality of data partitions yielded by clustering algorithms. Recently, M. Moshtaghi, et al. (see "Online Cluster Validity Indices for Streaming Data", ArXiv e-prints, January 2018, arXiv:1801.02937v1 [stat.ML]; and "Online cluster validity indices for performance monitoring of streaming data clustering. International Journal of Intelligent Systems, 34(4):541-563, 2019) introduced the class of incremental cluster validity indices (iCVIs) to evaluate partitions yielded by streaming clustering algorithms. This was accomplished by presenting a recursive formulation for a quantity known as fuzzy compactness, thereby enabling the incremental computation of the sum-of-squares (SS)-based CVIs of Xie-Beni (Xie, L., et al., "A Validity Measure for Fuzzy Clustering", IEEE Trans. Pattern Anal. Mach. Intell., 13(8):841-847, August 1991) and Davies-Bouldin (D. L. Davies, et al., "A cluster separation measure. IEEE Transactions on Pattern Analysis and Machine Intelligence, PAMI-1(2):224-227, April 1979. The class of iCVIs was expanded (see O. A. Ibrahim, et al., "Evaluating Evolving Structure in Streaming Data With Modified Dunn's Indices", IEEE Transactions on Emerging Topics in Computational Intelligence, pages 1-12, 2019; O. A. Ibrahim, et al., "A new incremental cluster validity index for streaming clustering analysis", IEEE International Conference on Fuzzy Systems (FUZZ-IEEE), pages 1-8, 2019; L. E. Brito da Silva, "Neuroengineering of clustering algorithms", Ph.D. dissertation, Missouri University of Science and Technology, Rolla, MO, USA, 2019; and L. E. Brito da Silva, et al., "Incremental Cluster Validity Indices for Online Learning of Hard Partitions: Extensions and Comparative Study", IEEE Access, 8:22025-22047, 2020) to also include incremental versions of other SS- and non-SS-based bCVIs: generalized Dunn 43 and 53 (C. Bezdek, et al., "Some new indexes of cluster validity", IEEE Transactions on Systems, Man, and Cybernetics, Part B (Cybernetics), 28(3):301-315, June 1998), Calinski-Harabasz (T. Calinski, et al., "A dendrite method for cluster analysis", Communications in Statistics, 3(1):1-27, 1974), Pakhira-Bandyopadhyay-Maulik (Malay K. Pakhira, et al., "Validity index for crisp and fuzzy clusters", Pattern Recognition, 37(3):487-501, 2004), WB-index (Q. Zhao, et al., "WB-index: A sum-of-squares based index for cluster validity. Data & Knowledge Engineering, 92:77-89, 2014), centroid-based Silhouette (M. Rawashdeh, et al., "Center-wise intra-inter silhouettes", Eyke Hullermeier, Sebastian Link, Thomas Fober, and Bernhard Seeger, editors, Scalable Uncertainty Management, pages 406-419, Berlin, Heidelberg, 2012. Springer), partition coefficient and exponential separation (K.-L. Wu, et al., "A cluster validity index for fuzzy clustering", Pattern Recognition Letters, 26(9):1275-1291, 2005), representative cross information potential and representative cross-entropy (D. Araújo, et al., "Information-theoretic clustering: A representative and evolutionary approach", Expert Systems with Applications, 40(10):4190-4205, 2013), negentropy increment (L. F. Lago-Fernández, et al., "Normality-based validation for crisp clustering", Pattern Recognition, 43(3):782-795, 2010), and conn_index (K. Tasdemir, et al., "A Validity Index for Prototype-Based Clustering of Data Sets With Complex Cluster Structures", IEEE Transactions on Systems, Man, and Cybernetics, Part B (Cybernetics), 41(4):1039-1053, August 2011).

Cluster validity indices have been traditionally used as fitness functions in optimization algorithms to perform offline clustering. For instance, Araújo et al. ("Clustering using elements of information theory", Artificial Neural Networks—ICANN 2010, 2010, pp. 397-406) presented an iterative clustering method that uses Renyi's cross-entropy as the fitness function, wherein a data set is over-partitioned via multiple prototypes, to which labels are randomly assigned and then swapped until convergence; Brito da Silva, et al. ("Validity Index-based Vigilance Test in Adaptive Resonance Theory Neural Networks", Proc. IEEE Symposium Series on Computational Intelligence (SSCI), pages 1-8, November 2017) presented an offline incremental clustering algorithm consisting of a fuzzy ART network (G. A. Carpenter, et al., "Fuzzy ART: Fast stable learning and categorization of analog patterns by an adaptive resonance system", Neural Networks, 4(6):759-771, 1991) augmented with bCVIs as an additional vigilance parameter; other examples include the works in R. Xu, et. al, "A Comparison Study of Validity Indices on Swarm-Intelligence-Based Clustering", IEEE Transactions on Systems, Man, and Cybernetics, Part B (Cybernetics), 42(4):1243-1256, August 2012; and C. Smith, et al., "Particle Swarm Optimization in an adaptive resonance framework", Proc. IEEE International Joint Conference on Neural Networks (IJCNN), pages 1-4, July 2015. In the context of online clustering, E. Lughofer ("Extensions of vector quantization for incremental clustering", Pattern Recognition, 41(3):995-1011, 2008) presented an adaptive resonance theory (ART)-like online incremental clustering algorithm that used a non-SS-based iCVI to guide a splitting and merging heuristic. M. Chenaghlou ("Data stream clustering and anomaly detection", PhD thesis, The University of Melbourne, 2019) presented an online incremental clustering framework that combined online incremental clustering algorithms and an iCVI-based controller to determine the creation and merging of cluster prototypes. O. A. Ibrahim et al. ("Analysis of streaming clustering using an incremental validity index", 2018 IEEE International Conference on Fuzzy Systems (FUZZ-IEEE), pages 1-8, July 2018) used the compactness to aid in making decisions regarding the emergence of clusters when performing online incremental clustering.

In "ARTMAP: Supervised real-time learning and classification of nonstationary data by a self-organizing neural network", Neural Networks, vol. 4, Issue 5, 1991, Pages 565-588, Carpenter, G. A., et al. introduced a new neural network architecture, called ARTMAP, that autonomously learns to classify arbitrarily many, arbitrarily ordered vectors into recognition categories based on predictive success. This supervised learning system is built up from a pair of Adaptive Resonance Theory modules (ARTa and ARTb) that are capable of self-organizing stable recognition categories in response to arbitrary sequences of input patterns, and a map field module that is responsible for the mapping between the categories of ARTa and ARTb modules. Since then, ARTMAP and its three modules, usually referred to in the literature as "ART A", "ART B" and "map field", have become widely studied and well-known constructs.

In "Fuzzy ARTMAP: A neural network architecture for incremental supervised learning of analog multidimensional maps", IEEE Transactions on Neural Networks, 3(5):698-713, September 1992, and "A fuzzy ARTMAP nonparametric probability estimator for nonstationary pattern recognition problems", IEEE Transactions on Neural Networks, 6(6):1330-1336, November 1995, Carpenter, G. A., et al., further disclosed an ARTMAP variant that incorporates fuzzy logic and is, accordingly, known in the literature as "fuzzy ARTMAP".

Although adaptive resonance theory predictive mapping (ARTMAP) neural networks have been typically used for supervised machine learning purposes, some variants have been converted to perform unsupervised learning, such as hierarchical divisive clustering via the SMART model in G. Bartfai, "Hierarchical clustering with ART neural networks, Proc. IEEE International Conference on Neural Networks (ICNN), vol. 2, June 1994, pp. 940-944, and biclustering via the BARTMAP model in R. Xu, et al., "BARTMAP: A viable structure for biclustering", Neural Networks, 24(7): 709-716, September 2011; and U.S. Pat. No. 9,043,326 (R. Xu, et al., "Methods and systems for biclustering algorithm"). BARTMAP was further enhanced with multi-prototype representation using topological learning in the TopoBARTMAP model (R. Yelugam, et al., "TopoBARTMAP: Biclustering ARTMAP With or Without Topological Methods in a Blood Cancer Case Study", Proc. IEEE International Joint Conference on Neural Networks (IJCNN), 2020), while the hierarchical BARTMAP model (S. Kim, "Novel approaches to clustering, biclustering algorithms based on adaptive resonance theory and intelligent control", PhD thesis, Missouri University of Science and Technology, 2016) generates a hierarchy of biclusters whose levels are evaluated using a bCVI. In addition, mixed-modality learning capability is realized by the ARTMAP-like model introduced in J. Seiffertt, et al., "Unified Computational Intelligence for Complex Systems", vol. 6, Evolutionary Learning and Optimization, Springer, 2010. However, none of these ARTMAP-based models employ iCVIs to guide the clustering process. It is also worth noting that the ARTMAP variant used to incrementalize the conn_index relies on ground truth labels for the purposes of a clustering algorithm agnostic experimentation, and hence does not perform unsupervised machine learning.

No prior art clustering method has been able to combine iCVIs and supervised machine learning methods such as ARTMAP.

DETAILED DESCRIPTION

In general, embodiments disclosed here allow a user to select an iCVI and perform offline incremental multi-prototype-based clustering via ARTMAP. Offline clustering is also known as batch clustering. This embodiment also significantly accelerates offline clustering when cluster validity indices are computed, so it is preferred over other methods for offline clustering with cluster validity indices. The offline clustering process makes use of such iCVI for decision-making (regarding sample allocation to clusters, as well as deletion, merging and splitting of clusters) while incrementally building associative mappings between prototypes (categories) to clusters.

Clustering is an unsupervised learning task; thus, true labels of the samples of a data set are not provided to classify data into groups. The solution presented here and shown in FIG. 1, namely the iCVI-ARTMAP 100, consists of a fuzzy ARTMAP neural network as in G. A. Carpenter, et al., "Fuzzy ARTMAP: A neural network architecture for incremental supervised learning of analog multidimensional maps", IEEE Transactions on Neural Networks, 3(5):698-713, September 1992, and "A fuzzy ARTMAP nonparametric probability estimator for nonstationary pattern recognition problems", IEEE Transactions on Neural Networks, 6(6):1330-1336, November 1995, whose ART B module is replaced by an iCVI module 103. The latter is responsible for constructing labels for each input presented, as well as incrementally updating the selected iCVI throughout the unsupervised machine learning process. A map field 101, and ART A (fuzzy ART equipped with a counter that stores the current number of samples assigned to each category) 102 modules maintain most of their original dynamics as disclosed by G. A. Carpenter, super. The labels for each sample generated by the iCVI module follow the one-hot encoding standard and correspond to the optimal assignment—given the selected iCVI—of a sample. Note that the iCVI may yield different labels for the same sample at different iteration times.

At each iteration, the iCVI values are incrementally computed by swapping the presented sample between current clusters. The iCVI variables associated with the current partition are also cached (see L. E. Brito da Silva, et al., super) to speed up the neural network training. At the end of each epoch, the system attempts to merge clusters to improve the partition quality. Next, if necessary, the system attempts to split clusters to enforce the desired number of clusters. These operations are performed incrementally, however, in the split case, the parent cluster that is split has its iCVI variables updated incrementally whereas the newly created cluster has its iCVI variables computed in batch mode. The map field, which may, for example, be implemented as an associative network, allows for multi-prototype representation of the clusters. The user can seamlessly select the iCVI to match the input data characteristics and application at hand.

Figure 1:
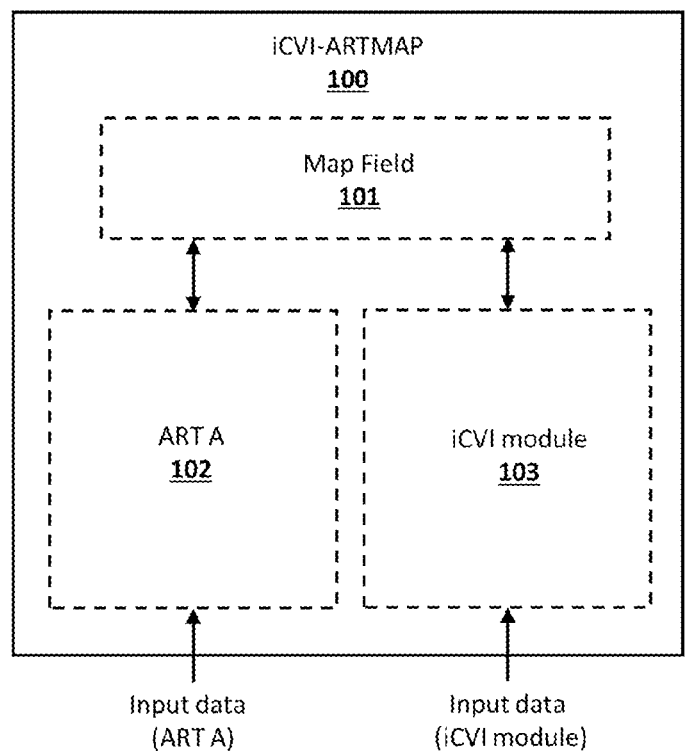
FIG. 1 depicts the components of an iCVI-ARTMAP neural network.

The different software routines and components illustrated in FIG. 1 may be embodied as computer-executable code stored in any conventional storage or memory system or combination thereof on one or more computing platforms, and which, when executed on one or more processing units, cause the processing units and other conventional hardware components to carry out the various I/O operations, storage requirements, computations, and updating routines, etc., described here.

Figure 2:
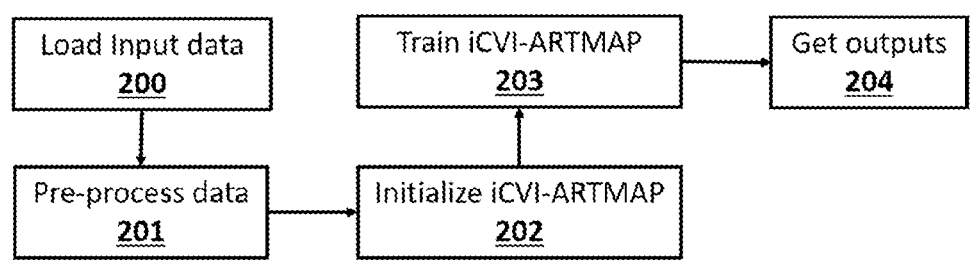
FIG. 2 depicts a data clustering procedure using the iCVI-ARTMAP neural network shown in FIG. 1.

FIG. 2 depicts a data clustering procedure using the iCVI-ARTMAP neural network (shown in FIG. 1). After the data (X) is loaded (step 200) it is duplicated. Next, each copy undergoes user-defined transformations (step 201) as a preprocessing stage. Such transformations need not be equal, and examples include min-max normalization and complement coding for the ART A module (processed data version $X^a$) and standardization for the iCVI module (processed data version $X^b$). Step 202 corresponds to the initialization of the map field matrix and ART A categories, creation of an initial partition based on the assignment of the data samples to the initial ART A categories, and the initialization of the iCVI value and associated variables (which may include, but are not limited to, some cluster sample statistics (such as frequencies (i.e., sample counts), means, compactnesses, covariance matrices) and/or (dis)similarity matrices) given the initial partition. In that step, the user must provide all the required iCVI-ARTMAP model parameters. The ART A categories may be initialized using random samples, kmeans++ (D. Arthur, et al., "K-Means++: The Advantages of Careful Seeding", Proceedings of the Eighteenth Annual ACM-SIAM Symposium on Discrete Algorithms, SODA'07, page 1027-1035, USA, 2007, Society for Industrial and Applied Mathematics), or centroids from kmeans (J. B. MacQueen, et al. "Some Methods for Classification and Analysis of MultiVariate Observations", M. Le Cam and J. Neyman, editors, Proc. fifth Berkeley Symposium on Mathematical Statistics and Probability, volume 1, pages 281-297. University of California Press, 1967) clustering algorithm. If the latter initialization is chosen, then kmeans is applied to $X^b$, the obtained centroids undergo the inverse transformation that generated $X^b$ followed by the same transformations that generated $X^a$. Following these, some additional variables are initialized, such as the frequency count for each ART A category. Step 203 corresponds to the unsupervised machine learning task itself (i.e., clustering task), which is further detailed in FIG. 3. Step 204 corresponds to fetching the outputs of the clustering task: data partition labels and trained iCVI-ARTMAP neural network (ART A, map field and iCVI variables).

Figure 3:
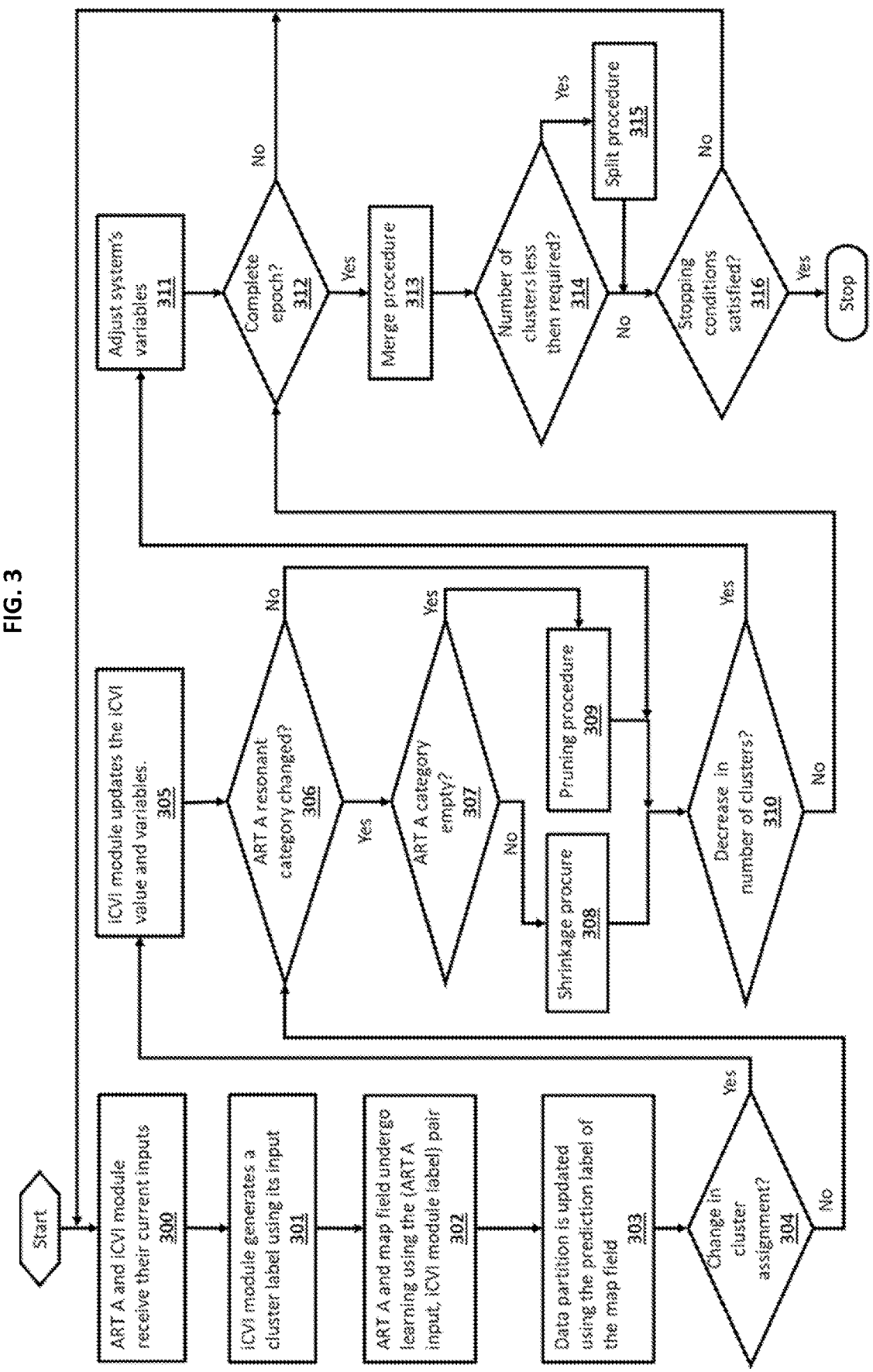
FIG. 3 illustrates a training procedure for the iCVI-ARTMAP network (step 203 shown in FIG. 2).

FIG. 3 depicts a training procedure for the iCVI-ARTMAP network (step 203 shown in FIG. 2). Step 300 corresponds to the presentation of the pre-processed inputs to iCVI-ARTMAP: one to ART A (input sample $x^a$) and the other to the iCVI module (input sample $x^b$). As previously mentioned, these two inputs correspond to the same input subjected to the selected transformations. At step 301 the iCVI module computes a temporary iCVI value for the assignment of its current input to each cluster of the current data partition. This is accomplished by using the "swap" (removal of the presented input from the cluster it is currently assigned followed by its addition to a different cluster) and "no" (the current iCVI value corresponding to the current cluster assignment of the presented input does not need to be recomputed) operations. Depending on the iCVI selected, one or more of the following variables may need to be incrementally computed (t represents the iteration):

$$n_{i,new} = \begin{cases} n_i(t)+1, & \text{add operation} \\ n_i(t)-1, & \text{remove operation} \\ n_i(t), & \text{no operation} \end{cases} \quad (EQ\ 1)$$

$$\mu_{i,new} = \begin{cases} \dfrac{n_i(t)}{n_{i,new}}\mu_i(t) + \dfrac{1}{n_{i,new}}x^b, & \text{add operation} \\ \dfrac{n_i(t)}{n_{i,new}}\mu_i(t) - \dfrac{1}{n_{i,new}}x^b, & \text{remove operation} \\ \mu_i(t), & \text{no operation} \end{cases} \quad (EQ\ 2)$$

$$CP_{i,new} = \begin{cases} CP_i(t) + \dfrac{n_i(t)}{n_{i,new}}\|x^b - \mu_i(t)\|_2^2, & \text{add operation} \\ CP_i(t) - \dfrac{n_i(t)}{n_{i,new}}\|x^b - \mu_i(t)\|_2^2, & \text{remove operation} \\ CP_i(t), & \text{no operation} \end{cases} \quad (EQ\ 3)$$

$$\sum_{i,new} = \begin{cases} \dfrac{n_i(t)-1}{n_i(t)}\sum_i(t) + \dfrac{1}{n_i(t)+1}[x^b-\mu_i(t)][x^b-\mu_i(t)]^T, & \text{add operation} \\ \dfrac{n_i(t)-1}{n_i(t)-2}\sum_i(t) - \dfrac{n_i(t)}{[n_i(t)-1][n_i(t)-2]}[x^b-\mu_i(t)][x^b-\mu_i(t)]^T, & \text{remove operation} \\ \sum_i(t), & \text{no operation} \end{cases} \quad (EQ\ 4)$$

where $X^b$ is the input to the iCVI module and n, μ, CP, and Σ are the frequency, mean, compactness and covariance matrix of cluster i, respectively.

As previously mentioned, the iCVI value is computed for the assignment of the input to each cluster. Note that not all the iCVI variables are recomputed, solely the ones associated with the cluster change (if any). The "add" operation in equation (EQ 3) is a more succinct formulation for the crisp version of the fuzzy compactness presented in M. Moshtaghi, et al., super, as compared to L. E. Brito da Silva, et al., super. The "add" operation in equation (EQ 4) is the classic incremental covariance update (R. O. Duda, et al., "Pattern Classification", John Wiley & Sons, 2nd edition, 2000). The derivation of the "remove" operations in equations (EQ 3) and (EQ 4) follow the same rationale used for their "add" operation counterpart. A small term δI (I is the identity matrix) is added to the covariance to avoid numerical errors as described in L. E. Brito da Silva, et al., super, Next, a one-hot encoded label y is generated for the cluster assignment that optimizes the selected iCVI:

$$y_l = \begin{cases} 1, & \text{if } l = \underset{i}{\operatorname{argmax}}(T_i^b) \\ 0, & \text{otherwise} \end{cases}, l \in \{1, \ldots, k\} \quad (EQ\ 5)$$

where k is the number of clusters, $T_i^b$ is the temporary iCVI value (or its negative if the iCVI is min-optimal) corresponding to assigning the current sample to cluster i, and y= $\vec{1}$ if all $T_i^b$ are equal.

At step 302 the iCVI-ARTMAP neural network undergoes incremental learning using the cluster label y generated by the iCVI module and the ARTMAP's ART A input $x^a$. Specifically, the fuzzy ARTMAP (see G. A. carpenter, et al. references, super) is used for the realization of iCVI-ARTMAP, in which the following dynamics take place: after presenting the input $x^a$, the ART A category J that maximizes the activation function $T_j$ given by $$T_j = \frac{\|x^a \wedge w_j\|_1}{\alpha + \|w_j\|_1}, \alpha > 0, \quad \text{(EQ 6)}$$

is subjected to a vigilance test defined by $$M_J = \frac{\|x^a \wedge w_J\|_1}{\|x^a\|_1} \geq \rho_a, 0 \leq \rho_a \leq 1, \quad \text{(EQ 7)}$$

where $T_j$ and $w_j$ are the activation and weight vector of category j, respectively; the operator $\wedge$ represents a component-wise minimum between two vectors, $\|\cdot\|_1$ is the L1 norm, $M_J$ is the match function of category J with weight vector $w_J$ and $\rho_a$ is the vigilance parameter of ART A. If the inequality (EQ 7) is satisfied, then category J is also subject to a map field vigilance test defined by $$M_J^{ab} = \frac{\|y \wedge w_J^{ab}\|_1}{\|y\|_1} \geq \rho_{ab}, 0 \leq \rho_{ab} \leq 1, \quad \text{(EQ 8)}$$

where $w_J^{ab}$ is a row vector of the map field mapping matrix $W^{ab}$ associated with category J. If the inequality (EQ 8) is also satisfied, then category J of ART A undergoes adaptation $$w_J(t+1) = (1-\beta)w_J(t) + \beta[x^a \wedge w_J(t)], 0 < \beta \leq 1, \quad \text{(EQ 9)}$$

as well as the map field $$w_J^{ab}(t+1) = (1-\beta_{am})w_J^{ab}(t) + \beta_{ab}[y \wedge w_J^{ab}(t)], 0 < \beta_{ab} \leq 1, \quad \text{(EQ 10)}$$

If category J does not satisfy both inequalities, then the match tracking procedure increases the vigilance parameter of ART A by a small value $\varepsilon$, the next highest ranked category is selected, and the process repeated. This loop continues until either (i) a category meets both vigilance parameters or (ii) a new one is generated. If the latter case takes place, then $w_{new} = x^a$ and $w_{new}^{ab} = \vec{1}$.

At step 303, the cluster in the map field associated with the entry of the resonant category J of ART A is defined as the current prediction $$\text{label prediction} = \underset{i}{\text{argmax}}(w_{J,i}^{ab}) \quad \text{(EQ 11)}$$

and used to update the current data partition. At step 304 the cluster assignment of the current input is verified (equation (EQ 11)). If a change is detected in step 304, then at step 305 the iCVI module incrementally updates the corresponding iCVI variables and its value using a "swap" operation (a subset of EQ 1 through EQ 4). Otherwise, a "no" operation takes place and the iCVI value and variables remain the same. Step 306 verifies if the ART A resonant category J for the current input $x^a$ has changed; in the affirmative case, then the number of inputs associated with the ART A category I that had been previously associated with the current input $x^a$ is verified at step 307. If category I did not become empty, then, at step 308, this category shrinks using the samples assigned to it $$w_I(t+1) = \underset{x_i^a \in w_I}{\wedge} x_i^a \quad \text{(EQ 12)}$$

Otherwise, it is pruned at step 309 (associated iCVI-ARTMAP parameters are modified accordingly). The next step 310 consists of the verification of the total number of clusters in the current partition. If a cluster vanished (i.e., by not having any input assigned to it) then at step 311 the partition labels and iCVI-ARTMAP variables are adjusted accordingly. At step 312, it is verified if the current input presentation completes a full pass through the data. In the negative case then the next input is presented (step 300). In the affirmative case, then at step 313 pairs of clusters are hierarchically merged, such that at each stage, the pair i and j that yields the largest improvement of the iCVI value are merged, and the process continues until the value of the chosen iCVI worsens (i.e., when the iCVI worsens following a given merge, the cluster structure right before such merging operation is retained) or there are only 2 clusters left. The iCVI module computes the iCVI values incrementally using the "merge" operation. Depending on the chosen iCVI, one or more of the following variables might need to be recomputed incrementally:

$$n_{merged} = n_i(t) + n_j(t) \quad \text{(EQ 13)}$$

$$\mu_{merged} = \frac{n_i(t)}{n_{merged}} \mu_i(t) + \frac{n_j(t)}{n_{merged}} \mu_j(t) \quad \text{(EQ 14)}$$

$$CP_{merged} = CP_i(t) + CP_j(t) + \frac{n_i(t)n_j(t)}{n_{merged}} \|\mu_j(t) - \mu_i(t)\|_2^2 \quad \text{(EQ 15)}$$

$$\sum\nolimits_{merged} = \frac{n_i(t)-1}{n_{merged}-1} \sum\nolimits_i (t) + \frac{n_j(t)-1}{n_{merged}-1} \sum\nolimits_j (t) + \quad \text{(EQ 16)}$$

$$\frac{n_i(t)n_j(t)}{[n_{merged}][n_{merged}-1]} [\mu_j(t) - \mu_i(t)][\mu_j(t) - \mu_i(t)]^T$$

The partition labels and iCVI-ARTMAP variables are adjusted to reflect the changes caused by the pairwise "merge" operations (note that ART A weight vectors do not change during "merge" operations). In particular, the map field mapping matrix $W^{ab}$ grows as:

$$W^{ab}(t+1) = [W^{ab}(t)|C] \quad \text{(EQ 17)}$$

where the entries of the column vector C are computed as $$C_l = \begin{cases} \underset{m \in \{i,j\}}{\max}(w_{l,m}^{ab}(t)), & \text{if } \underset{m}{\text{argmax}}(w_{l,m}^{ab}(t)) \in \{i,j\} \\ \underset{m \in \{i,j\}}{\min}(w_{l,m}^{ab}(t)), & \text{otherwise} \end{cases} \quad \text{(EQ 18)}$$

and $W_l^{ab}(t)$ is a vector from the $l^{th}$ row of $W^{ab}(t)$. Next, the $i^{th}$ and $j^{th}$ columns corresponding to the merged clusters are deleted from $W^{ab}(t+1)$. At step 314 the number of clusters in the partitions is verified. If the number of clusters is smaller than the user-defined value, then "split" operations is attempted at step 315, wherein the system split clusters represented by multiple prototypes (if any) to restore the desired number of clusters.

During a split operation, the category from a multi-prototype cluster (defined with respect to both the map field prediction and current partition) with the best iCVI value when comprising a cluster on its own is selected as a new cluster. Splitting is performed until the desired number of clusters is achieved or there are no more multi-prototype clusters in the system. The iCVI values are incrementally recomputed if a split operation takes place (except for the newly created cluster, for which the iCVI variables are computed in batch mode). Depending on the chosen iCVI, one or more of the following variables might need to be recomputed incrementally for the parent cluster i:

$$n_{i,split} = n_i(t) - n_j(t) \quad \text{(EQ 19)}$$

$$\mu_{i,split} = \frac{n_i(t)}{n_{i,split}}\mu_i(t) - \frac{n_j(t)}{n_{i,split}}\mu_j(t) \quad \text{(EQ 20)}$$

$$CP_{i,split} = CP_i(t) - CP_j(t) - \frac{n_i(t)n_j(t)}{n_{i,split}}\|\mu_j(t) - \mu_i(t)\|_2^2 \quad \text{(EQ 21)}$$

$$\sum\nolimits_{i,split} = \frac{n_i(t)-1}{n_{i,split}-1}\sum\nolimits_i(t) - \frac{n_j(t)-1}{n_{i,split}-1}\sum\nolimits_j(t) - \quad \text{(EQ 22)}$$

$$\frac{n_i(t)n_j(t)}{[n_{i,split}][n_{i,split}-1]}[\mu_j(t)-\mu_i(t)][\mu_j(t)-\mu_i(t)]^T$$

The partition labels and iCVI-ARTMAP variables are updated accordingly (note that ART A weight vectors do not change during "split" operations). Specifically, the map field mapping matrix $W^{ab}$ grows as:

$$W^{ab}(t+1) = [W^{ab}(t)|C] \quad \text{(EQ 23)}$$

where the entries of the column vector C are computed as $$C_l = \begin{cases} \max_j(w^{ab}_{q,j}(t)), & \text{if } l = q \\ 0, & \text{otherwise} \end{cases} \quad \text{(EQ 24)}$$

and $w_q^{ab}(t)$ is a vector from the $q^{th}$ row of $W^{ab}(t)$ corresponding to the category q that was selected to become a new cluster. Next, the clusters to which category q was previously mapped to according to the map field prediction (equation (EQ 11)) is assigned the smallest value of $w_q^{ab}(t)$ in $W^{ab}(t+1)$, that is:

$$w^{ab}_{q,s}(t+1) = \min_j[w^{ab}_{q,j}(t)] \quad \text{(EQ 25)}$$

where $$s = \arg\max_j[w^{ab}_{q,j}(t)] \quad \text{(EQ 26)}$$

and $w_q^{ab}(t+1)$ is a vector from the $q^{th}$ row of $W^{ab}(t+1)$ corresponding to category q. In case $w_q^{an}(t)$ is a vector with identical components, then, except for the last component corresponding to the new cluster, all components $w_{q,j}^{ab}(t+1)$ are equal to $w_{q,j}^{ab}(t)$ minus a very small constant. Finally, if the number of clusters is equal to the value defined by the user or it is not possible to perform a split operation then step 316 takes place, in which the stopping conditions are checked to determine if the training should end. These include for instance, reaching the maximum number of epochs (one epoch corresponds to a full pass through the data), no change in ART A weight vectors (w) or the change in the iCVI value between two consecutive epochs is smaller than a tolerance parameter. If the stopping conditions are satisfied, then the training procedure stops.

This invention provides several advantages over the prior art. One improvement is that it provides an assessment of the quality of learning by a neural network incrementally, that is, "as you go". Furthermore, it converges under certain assumptions to the answer prior art systems would reach only during post-processing. The invention thus enables faster validation of machine learning. Although some prior art proposals have considered the use of iCVIs, only this invention provides for incorporating such techniques into an offline multi-prototype-based incremental clustering algorithm. This enables incremental updates of validation measures to affect the choice of cluster assignments while those assignments are actually being made.

Although the invention improves both speed and accuracy, there are other potential benefits of the described techniques. For example, they may also be used to adjust the vigilance parameter. As another example, the invention may also maintain speed and accuracy with fewer neurons than prior art solutions. Furthermore, it may allow representation of the data with fewer clusters.

The invention claimed is:

1. A method for machine learning, comprising:
   a) configuring an ART A (Adaptive Resonance Theory A) module of a fuzzy ARTMAP (Adaptive Resonance Theory Predictive Mapping) neural network as a fuzzy ART module;
   b) configuring an offline incremental cluster validity index (iCVI) module as a second input module to the fuzzy ARTMAP neural network;
   c) initializing a data set partition;
   d) initializing the ART A module, the offline iCVI module, and a map field of the fuzzy ARTMAP neural network corresponding to the initialized data set partition, said ART A module further having an ART A vigilance parameter;
   e) inputting pre-processed versions of a data set into both the ART A module and the offline iCVI module;
   f) in the offline iCVI module, computing temporary iCVI values for an assignment of a current sample of the pre-processed versions of the data set to each of a plurality of clusters in a current data partition and generating a current sample label for the current sample as a function of the computed temporary iCVI values;
   g) applying the current sample label to a vigilance test of the map field, said map field having a map field vigilance parameter;
   h) assigning a sample to an ART A category and an associated cluster mapped via the map field when both an ART A and the map field vigilance tests are simultaneously satisfied, but when the ART A vigilance parameter is satisfied but the map field vigilance parameter is not satisfied, then causing the ART A module to change its vigilance parameter;
   i) incrementally updating an ART A category weight vector and a corresponding map field weight vector when both the ART A and the map field vigilance tests are simultaneously satisfied;
   j) creating a new ART A category weight vector and a new corresponding map field weight vector when no existing ART A category simultaneously satisfies the ART A and the map field vigilance tests;
   k) incrementally updating iCVI variables and validation measures when assignments of samples of the data set to respective clusters change and adjusting assignments of the ART A categories to clusters according to the map field, thereby adjusting input-output relationship of the neural network; and
   l) generating subsequent data partitions with a multi-prototype cluster representation via a categories-to-clusters mapping of the map field.

2. The method of claim 1, wherein the offline iCVI module stores and updates variables and values of a user-selected incremental cluster validity index (iCVI), generates labels representing the assignment of data samples to clusters, as well as merges and splits clusters.

3. The method of claim 1, wherein the fuzzy ART module has a counter that stores a current number of samples assigned to each category.

4. The method of claim 1, wherein a true label of each sample of a data set is unknown.

5. The method of claim 2, wherein the iCVI module is user-selected and has associated iCVI variables.

6. The method of claim 5, in which the iCVI variables include at least one matrix representative of a degree of dissimilarity.

7. The method of claim 5, in which the iCVI variables include cluster sample statistics chosen from a group including frequencies, means, compactnesses, and covariance matrices.

8. The method of claim 1, wherein the offline iCVI module generates a one-hot encoded label indicating a best assignment of a sample to a cluster at a presentation time by incrementally recomputing a user-defined iCVI value and variables by swapping a sample between existing clusters.

9. The method of claim 1, wherein at the end of each iteration, the offline iCVI module computes temporary iCVI values for merging clusters of the current data partition of the pre-processed data set and hierarchically merges clusters with a best resulting iCVI value when such operation entails an iCVI improvement; further comprising temporarily recomputing the iCVI values and variables solely using the current variables stored within the iCVI module, which comprise less than the entirety of the data.

10. The method of claim 9, in which the iCVI module updates the iCVI variables and iCVI values with the corresponding temporarily computed iCVI variables and iCVI values upon the merging of the clusters.

11. The method of claim 1, wherein:
the offline iCVI module attempts to split multi-prototype clusters when a current number of clusters is smaller than a user-predefined value;
the iCVI variables of a new cluster are temporarily computed using the samples assigned to the category representing the new cluster;
the iCVI variables of a split cluster are temporarily recomputed using the current variables stored within the iCVI module and iCVI variables of the new cluster; and
the iCVI value is temporarily recomputed using the temporarily computed variables and the currently stored variables within the iCVI module.

12. The method of claim 11, in which the iCVI module updates the iCVI variables and iCVI values with the corresponding temporarily computed iCVI variables and iCVI values upon splitting of the clusters.

13. The method of claim 1, wherein the map field vigilance test considers the mapping of a selected category of the ART A module and the sample label provided by the offline iCVI module.

14. The method of claim 1, wherein the inputs for the offline iCVI module and ART A modules undergo their own pre-processing.

15. The method of claim 1, further comprising initializing data set partitioning by a user-selected method chosen from a set of methods including random selection of input samples and a vector quantization-based clustering routine as k-means.

16. The method of claim 1, wherein the data samples are iteratively presented until a termination criterion is met.

17. The method of claim 1, wherein labels of samples representing a current partition are stored and, at each input presentation, the corresponding label is updated according to a map field prediction.

18. The method of claim 1, further comprising:
pruning of ART A categories to which no sample are assigned;
updating ART A categories from which samples previously assigned to them have been re-assigned to other ART A categories;
updating the map field to reflect merging of clusters; and
updating the map field to reflect splitting of clusters.

* * * * *